Patented July 14, 1925.

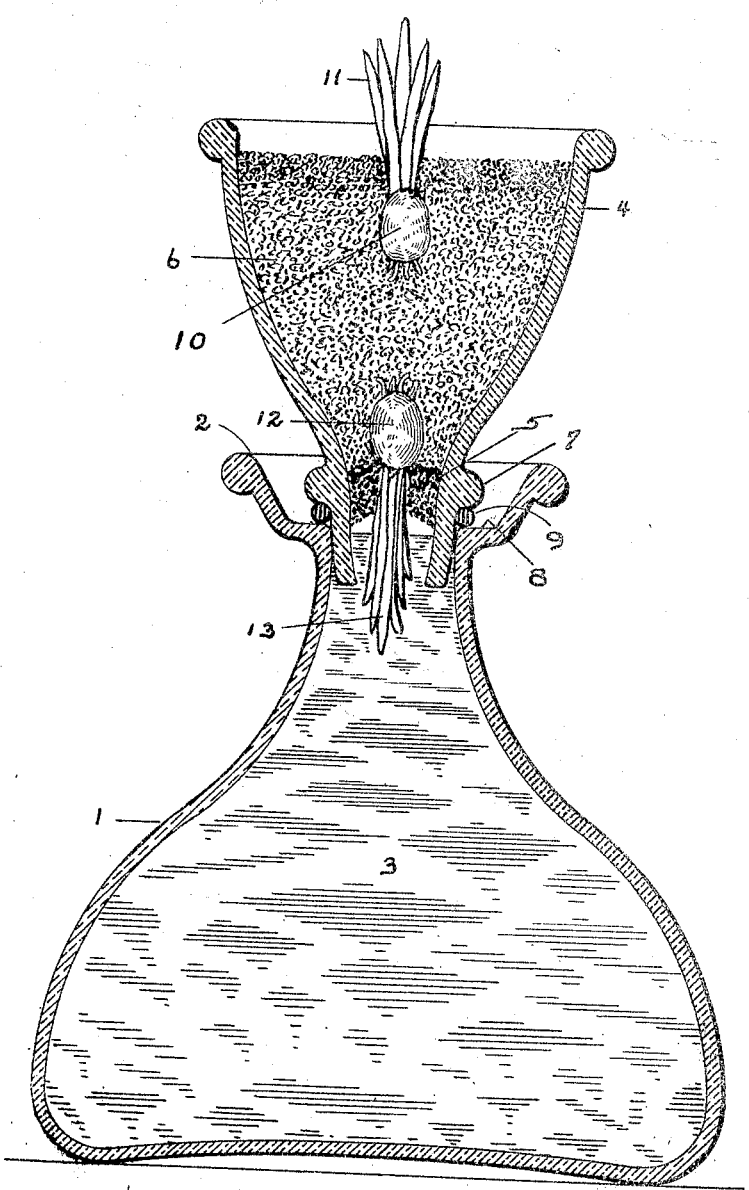

1,545,640

UNITED STATES PATENT OFFICE.

LÉON DENTRAYGUES, OF BURLINGAME, CALIFORNIA.

GROWING-PLANT RECEPTACLE.

Application filed June 2, 1923. Serial No. 643,009.

*To all whom it may concern:*

Be it known that I, LÉON DENTRAYGUES, a citizen of France, and a resident of Burlingame, in the county of San Mateo and State of California, have invented certain new and useful Improvements in Growing-Plant Receptacles, whereof the following is a specification.

This invention relates to growing plant receptacles.

The primary object of the invention is to provide a receptacle in which plants may be grown, in the house and elsewhere and in which the foliage and flowers of the plant may appear, and be seen, both above and below the body of the plant. Other, and incidental objects and features of the invention, will appear hereinafter.

In the accompanying one sheet of drawing I have illustrated that embodiment of my invention which is the best as yet devised by me.

The figure is a sectional elevation, showing the receptacle, and the contents thereof, and showing, also, in elevation, two plants growing therein, one growing downward, and one growing upward.

Referring to the drawing: A transparent vessel 1, of glass or other material, having, preferably, the shape of a carafe, or other ornamental configuration, is provided, at the top, with a flaring mouth 2.

The vessel 1 is adapted to be filled with water, or other liquid 3. Above the vessel 1 is a second vessel 4 of a funnel shape, sufficiently contracted at its lower end to slightly enter the vessel 1, and adapted to contain a soil, or growing medium, in which plants may be embedded. At the lower end of vessel 4 I prefer to use a layer of heavy soil 5 which will wedge into the contracted opening at the bottom of the vessel 4, and will constitute a holding means for the material above it, which may be the same, or a lighter material, as 6. Near its lower end the vessel may have an exterior rib 7 between which and the mouth of vessel 1, at 8, I place a packing 9, here as a rubber ring.

In the soil 6 I place one or more plants, preferably flowering plants for ornament. These nearest the top will naturally grow upward into the atmosphere, whilst those near the bottom, I have found, will grow downward, into vessel 1. These plants may be fed with water, or nourishing liquid, by pouring the same into the open mouth or top of vessel 4. Such liquid will percolate downward through the soil to vessel 1, which is first filled with water, and the surplus be received in the saucer formed by the flaring top 2.

I have shown one plant embedded in the soil 6, near the top thereof, the roots 10 developing therein, and the foliage 11 growing upward into the air, and one plant embedded near the bottom of the soil, with its roots 12 developing in the soil, and the foliage 13 growing downward into the water in vessel 1.

In due time, as I have found, blossoms will form upon these plants, both at the top, in the atmosphere, and below, in the water, and present a very pleasing and unique appearance. Of course, the number of plants, growing either upward or downward, is limited only by the size of the apparatus.

In practice, I have obtained very pleasing results from the use of hyacinths, and by combining the different colors, produce a very beautiful living bouquet.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit and scope of my invention as defined in the appended claims.

What I claim and desire to secure by Letters Patent of the United States, is the following, to-wit:—

1. In a growing plant receptacle the combination of a lower transparent vessel, an upper vessel mounted on said lower transparent vessel, a pair of oppositely disposed plants in said upper vessel, one of said plants growing downwardly into said lower vessel and the other of said plants growing upwardly from said upper vessel.

2. In a growing plant receptacle the combination of a lower transparent vessel, an upper vessel removably mounted on said lower transparent vessel, a pair of oppositely disposed plants in said upper vessel, one of said plants growing downwardly into said lower vessel and the other of said plants growing upwardly from said upper vessel.

3. In a growing plant receptacle the combination of a lower transparent vessel, an upper vessel mounted on said lower vessel, soil in said upper vessel, a pair of oppositely disposed plants planted in said soil, one of said plants growing downwardly into said lower vessel and the other of said plants growing upwardly from said upper vessel.

4. In a growing plant receptacle the combination of a lower transparent vessel having an open mouth, an upper vessel mounted on said lower vessel and provided with a contracted open bottom engaging in said open mouth, liquid in said lower vessel and soil in said upper vessel, a pair of oppositely disposed plants planted in said soil one of said plants growing downwardly into said lower vessel and the other of said plants growing upwardly into the air.

5. In a growing plant receptacle the combination of a lower transparent vessel having an open mouth, an upper vessel mounted on said lower vessel and provided with a contracted open bottom engaging in said open mouth, liquid in said lower vessel and soil in said upper vessel, means for preventing the soil from falling from the upper vessel into the lower vessel, and a pair of oppositely disposed plants planted in said soil one of said plants growing downwardly into said lower vessel and the other of said plants growing upwardly into the air.

6. In a growing plant receptacle the combination of a lower transparent vessel having an open mouth, an upper vessel mounted on said lower vessel and provided with a contracted open bottom engaging in said open mouth, liquid in said lower vessel and soil in said upper vessel, cushion means between said vessels, and a pair of oppositely disposed plants planted in said soil one of said plants growing downwardly into said lower vessel and the other of said plants growing upwardly into the air.

In testimony that I claim the foregoing, I have hereto set my hand this 28 day of May, 1923.

LÉON DENTRAYGUES.